United States Patent
Sugawara et al.

(10) Patent No.: US 7,110,199 B2
(45) Date of Patent: Sep. 19, 2006

(54) INFORMATION RECORDING AND REPRODUCING APPARATUS, SIGNAL DECODING CIRCUIT, AND INFORMATION RECORDING MEDIUM AND METHOD

(75) Inventors: Takao Sugawara, Kawasaki (JP); Kazuhito Ichihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 10/002,861

(22) Filed: Nov. 15, 2001

(65) Prior Publication Data

US 2003/0030930 A1    Feb. 13, 2003

(30) Foreign Application Priority Data

Jun. 29, 2001    (JP) .............................. 2001-198716

(51) Int. Cl.
*G11B 5/09*    (2006.01)
(52) U.S. Cl. ...................................... 360/48
(58) Field of Classification Search .............. 360/48, 360/51
See application file for complete search history.

(56) References Cited

U.S. PATENT DOCUMENTS

| | | | | |
|---|---|---|---|---|
| 4,392,164 A * | 7/1983 | Lequien | ................... | 360/77.08 |
| 5,523,991 A * | 6/1996 | Mizokami et al. | ....... | 369/59.19 |
| 5,838,512 A * | 11/1998 | Okazaki | ....................... | 360/51 |
| 5,881,037 A * | 3/1999 | Tanaka et al. | ................ | 360/48 |
| 6,178,057 B1 * | 1/2001 | Kuroda et al. | ................. | 360/51 |
| 6,295,176 B1 * | 9/2001 | Reddy et al. | ................. | 360/51 |
| 6,665,138 B1 * | 12/2003 | Kim | ....................... | 360/77.02 |
| 6,940,800 B1 * | 9/2005 | Fujimoto et al. | ........ | 369/59.22 |
| 6,982,939 B1 * | 1/2006 | Powelson et al. | ........ | 369/47.53 |

* cited by examiner

*Primary Examiner*—Wayne Young
*Assistant Examiner*—Glenda P. Rodriguez
(74) *Attorney, Agent, or Firm*—Greer, Burns & Crain, Ltd.

(57) ABSTRACT

Upon data recording, a data recording unit inserts revise bytes as a predetermined specific code train into at least two or more portions including the head and last portions of data and records the data onto a medium. Upon data reproduction, a data reproducing unit separates a head reproduced signal by using clocks and, thereafter, executes a clock extraction and an amplitude correction by using a signal corresponding to the revise bytes as a specific code train. In principle, an RLL code for the clock extraction and gain tracking is eliminated and, in place of the RLL code, the revise bytes comprising the specific code train are inserted into the data and the data is recorded onto the medium.

3 Claims, 15 Drawing Sheets

INFORMATION RECORDING AND REPRODUCING APPARATUS, SIGNAL DECODING CIRCUIT, AND INFORMATION RECORDING MEDIUM AND METHOD

BACKGROUND OF THE INVENTION

1. Field of the Invention

The invention relates to an information recording and reproducing apparatus of a magnetic disk, an MO, an optical disk, a magnetic tape device, or the like and to a signal decoding circuit and information recording medium and method. More particularly, the invention relates to an information recording and reproducing apparatus for sampling a head reproduced signal by an asynchronous dock and, thereafter, performing a timing recovery and a gain control and to a signal decoding circuit and information recording medium and method.

2. Description of the Related Arts

FIG. 1 shows an example of a sector format in a conventional magnetic disk apparatus, and it is constructed by a preamble part 200, sync bytes 202, data 204, an ECC 206, and a pad 208. That is, a specific code train called a preamble part 200 is recorded at the head in the sector format. Upon reproduction, acquisition of a phase and a frequency of a timing recovery PLL circuit for clock extraction and acquisition of a gain in an AGC circuit for amplitude correction are performed by using a head reproduced signal corresponding to the preamble part 200. A specific code train called sync bytes 202 is recorded in the second area. Upon reproduction, the sync bytes 202 are detected and a head bit of the subsequent data 204 is presumed. Hitherto, the data 204 is converted into an RLL code (Run Length Limited Code) in which a length for which a code "0" continues is limited so as to follow the clock extraction and amplitude correction and recorded. Therefore, position information of the head bit of the data 204 is used for decoding the RLL code.

A recent magnetic disk apparatus uses an MR (magnetoresistive) head as a reproducing head. Since the MR head floats above the surface of the disk medium only by 30 to 50 nm, there is a case where the head is come into contact with or collides with a projection or the like on the disk surface. When the contact or collision occurs, a resistance value increases in association with an increase in head temperature, so that a DC level of a reproduced signal fluctuates largely. Such a phenomenon is called a thermal asperity (TA) phenomenon. When the TA occurs, a signal of a large amplitude is inputted and an adverse influence is caused in the AGC circuit and PLL circuit which have been operating stably so far, so that an error is generated in demodulation data. In order to enable the data to be decoded even in the case where the sync bytes cannot be detected due to the data error by such a thermal asperity (TA), as shown in a sector format of FIG. 2, the data is split into two data 204-1 and 204-2 and spare sync bytes 202-2 are provided in addition to sync bytes 202-1. In this case, generally, the sync bytes 202-1 and 202-2 are separated by presuming a case where the reproduced signal deteriorates in a wide range. When a portion including the sync bytes 202-1 deteriorates upon reproduction of the data, although the data 204-1 subsequent to the sync bytes 202-1 cannot be demodulated, by setting a length of data 204-1 to a length below the maximum correcting ability of the ECC, the error can be corrected.

FIG. 3 is a diagram showing a block in a read channel which is installed as a data demodulating IC into a conventional magnetic disk apparatus. Upon data reproduction, an analog voltage from the reproducing head is amplified by a preamplifier of a head IC and, thereafter, it is sent to a read channel 210. In the read channel 210, the signal passes through a variable gain amplifier (VGA) 212, a CT filter 214 which functions as a low pass filter, and an A/D converter (ADC) 216 and is converted into a digital signal. Subsequently, a waveform equalization is executed by an FIR filter 218 and, thereafter, for example, a Viterbi decoding is executed by a decoder 220. The decoded data is further decoded by an RLL decoder 222. At this time, a head bit position detected by a sync byte detector 230 is used.

A timing recovery unit 226 having a PLL to control timing of clocks which are generated from a voltage controlled oscillator (VCO) 228 in order to sample the signal by the A/D converter 216 is also installed in the read channel 210. A gain controller 224 for correcting an amplitude by controlling a gain of the variable gain amplifier 212 is also installed in the read channel 210. That is, the timing recovery unit 226 obtains a phase error $\Delta\tau$ by using an output signal y of the FIR filter 218 and its decision value Y={0, −1, +1} and controls the VCO 228 so as to eliminate the phase error $\Delta\tau$. A gain error $\Delta\gamma$ is obtained by the output signal y of the FIR filter 218 and its decision value Y={0, −1, +1} and a control voltage Vg of the gain controller 224 is adjusted so as to eliminate the gain error $\Delta\gamma$, thereby correcting the amplitude by the VGA 212.

FIG. 4 is a diagram showing another example of a construction of a conventional read channel. In this case, a sampling operation of the A/D converter 216 is performed asynchronously with the reproduced signal by using a fixed clock from a voltage controlled oscillator (VCO) 234. Subsequent to the FIR filter 218, an interpolating filter 232 is provided. An inherent sampling time T is obtained on the basis of the phase error $\Delta\tau$ of the equation (1) obtained by a timing recovery unit 236. An amplitude y at the sampling time T is obtained by an interpolating operation.

In the magnetic disk apparatus, if it is intended to accomplish the further high density recording, a recording area per bit decreases and an S/N ratio deteriorates. Therefore, many noise components are multiplexed even to an output of the FIR filter used in the waveform equalization of the read channel, a decision result Y in the decoder is also likely to become an error. In such a case, the operation of a feedback system of the timing recovery and the amplitude correction becomes unstable and there is a fear such that the data is not normally demodulated. The RLL code is constructed by selecting a data train (code word) in which the succession of "0" is restricted for the original data train. To design a code of high efficiency which takes into consideration a coding ratio, it is necessary to determine the code word from the front/rear relation of the original data. An error of one bit in the code word upon data demodulation becomes an error of a plurality of bits in a data train serving as an RLL decoder output. There is a problem such that such an error propagation remarkably deteriorates an effect of the ECC.

SUMMARY OF THE INVENTION

According to the invention, there are provided an information recording and reproducing apparatus, a signal decoding circuit, and information recording medium and method, in which stable clock extraction and amplitude correction are enabled against a deterioration of an S/N ratio of a signal without using an RLL code, thereby improving decoding performance.

According to the invention, there is provided an information recording and reproducing apparatus for recording and reproducing information onto/from a magnetic recording medium, comprising: a data recording unit which inserts revise bytes as a predetermined specific code train into at least two or more portions including head and last portions of data and records the data onto the medium upon data recording; and a data reproducing unit which separates a head reproduced signal by using clocks and, thereafter, executes a clock extraction and an amplitude correction by using a signal corresponding to the revise bytes as a specific code train upon data reproduction. Further, the data recording unit and the data reproducing unit record and reproduce user data onto/from the medium without encoding it to an RLL code. As mentioned above, according to the invention, in principle, the RLL code for clock extraction and gain tracking is eliminated, in place of it, revise bytes comprising a specific code train is inserted into the data, and the resultant data is recorded onto the medium. Since the revise bytes are a well-known data train, a decision value Y does not become an error. Even when an S/N ratio of a reproduced signal is low, the stable clock extraction and amplitude correction can be performed. Since the apparatus does not have an RLL decoder, error propagation due to the RLL decoding can be eliminated and the inherent ECC correcting ability can be made the most of.

In the clock extraction by the data reproducing unit, an inherent sampling time T is obtained on the basis of phase information extracted from the signal corresponding to the specific code train, and the signal amplitude synchronized with the clock is sampled again by an interpolating operation of an interpolating filter according to the sampling time T. The data recording unit arranges sync bytes to the head position of each data which was split by the specific code train and records the data onto the medium. The data reproducing unit detects sync bytes subsequent to the specific code train, presumes a head bit of the data, and obtains a synchronization of the ECC decoding. The data recording unit inserts sync bytes into the specific code train and records the data onto the medium. The data reproducing unit detects the sync bytes from the specific code train, presumes a head bit of the data, and obtains a synchronization of the decoding. By embedding the sync bytes into the revise bytes as mentioned above, the sync bytes are distributed and it is possible to cope with deterioration of the reproduced signal in a wider range. The data reproducing unit obtains a signal mean value and a standard deviation and an autocorrelation of noises by using the signal corresponding to the specific code train and uses them in a likelihood calculation of a data decoding. The data recording unit and the data reproducing unit are constructed by a signal processing integrated circuit. The signal processing integrated circuit is installed in a magnetic disk apparatus or an optical disk apparatus.

The invention provides a signal decoding circuit for recording and reproducing information onto/from a magnetic recording medium, comprising: a data recording unit which inserts a predetermined specific code train into at least two or more portions including head and last portions of data and records the data onto the medium upon data recording; and a data reproducing unit which separates a head reproduced signal by using clocks and, thereafter, executes a clock extraction and an amplitude correction by using a signal corresponding to the specific code train upon data reproduction. Other features of the signal decoding circuit are substantially the same as those of the information recording and reproducing apparatus.

The invention provides a recording structure of an information recording medium, wherein a recording signal series on the medium has a recording structure such that a predetermined specific code train has been inserted into at least two or more portions including head and last portions of data. The recording signal series has a recording structure such that sync bytes are arranged at a head position of each data which was split by the specific code train. The recording signal series can also have a recording structure such that sync bytes are inserted in the specific code train.

According to the invention, there is provided an information recording and reproducing method of recording and reproducing information onto/from an information recording medium, comprising the steps of: inserting a predetermined specific code train (revise bytes) into at least two or more portions including head and last portions of data and recording the data onto the medium upon data recording; and separating a head reproduced signal by using clocks and, thereafter, executing a clock extraction and an amplitude correction by using a signal corresponding to the specific code train upon data reproduction. Further, user data is recorded onto the medium without encoding it to an RLL code and, thereafter, reproduced from the medium.

In the clock extraction upon data reproduction, an inherent sampling time is obtained on the basis of phase information extracted from the signal corresponding to the specific code train, and the signal amplitude synchronized with the clock is sampled again by an interpolating operation of an interpolating filter according to the sampling time. Upon data recording, sync bytes are arranged to a head position of each data which was split by the specific code train, and the data is recorded onto the medium. Upon data reproduction, the sync bytes subsequent to the specific code train are detected, a head bit of the data is presumed, and a synchronization of a decoding is obtained. It is also possible to construct the method such that upon data recording, sync bytes are inserted into the specific code train and the data is recorded onto the medium, and upon data reproduction, the sync bytes are detected from the specific code train, a head bit of the data is presumed, and a synchronization of a decoding is obtained. Further, upon data reproduction, a signal mean value and a standard deviation and an autocorrelation of noises are obtained by using the signal corresponding to the specific code train and used in a likelihood calculation of a data decoding.

The above and other objects, features, and advantages of the present invention will become more apparent from the following detailed description with reference to the drawings.

DETAILED DESCRIPTION OF THE PREFERRED EMBODIMENT

Figure 5:
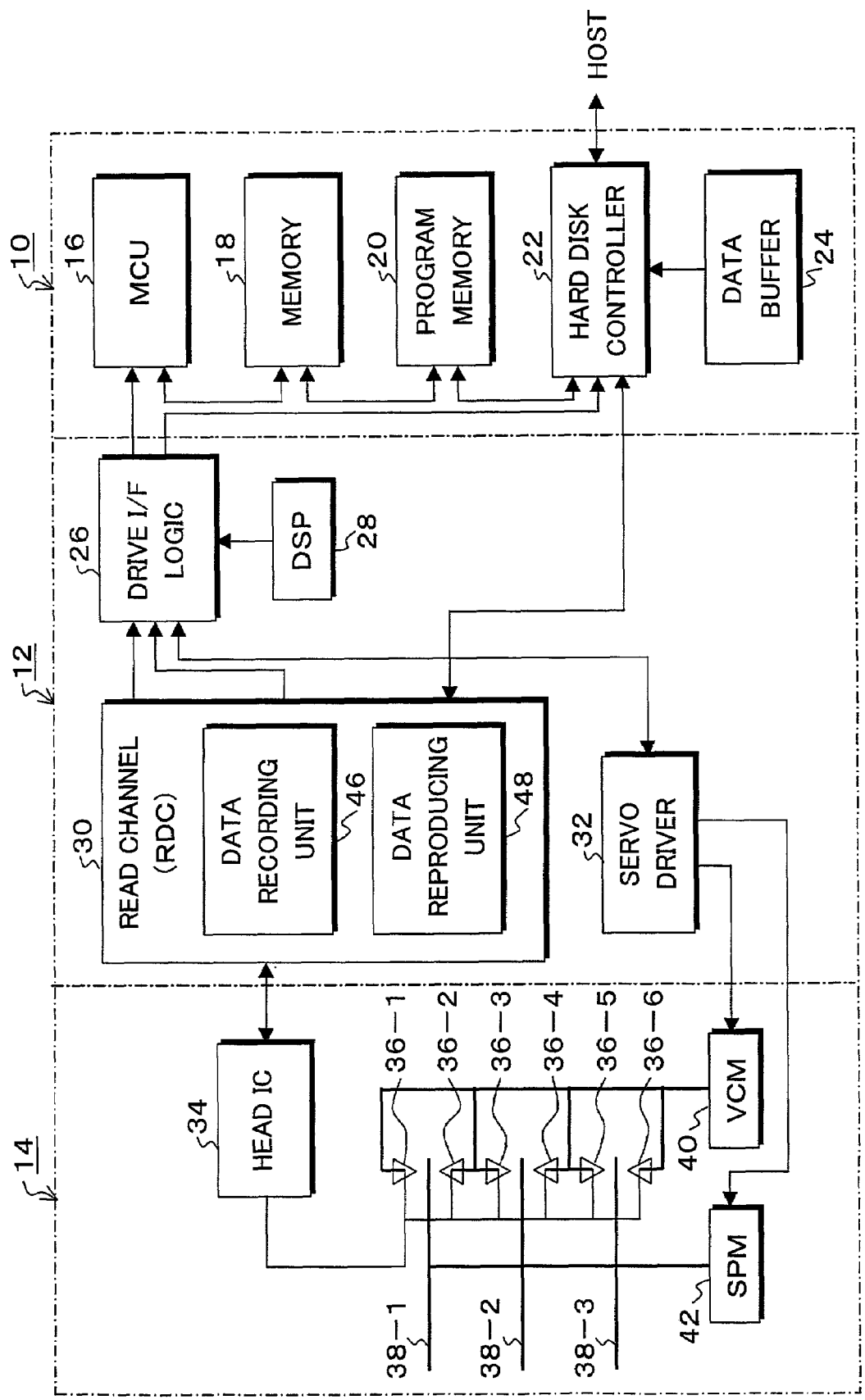
FIG. 5 is a block diagram of a hard disk drive to which the invention is applied.

FIG. 5 is a block diagram of a hard disk drive to which the invention is applied. The hard disk drive comprises an SCSI controller 10, a drive control 12, and a disk enclosure 14. An interface with a host is not limited to the SCSI controller 10 but another proper interface controller can be used. The SCSI controller 10 has: an MCU (main control unit) 16; a memory 18 using a DRAM or an SRAM which is used as a control memory; a program memory 20 using a non-volatile memory such as a flash memory or the like for storing a control program; a hard disk controller (HDC) 22; and a data buffer 24. The drive control 12 has: a drive interface logic 26; a DSP 28; a read channel (RDC) 30; and a servo driver 32. A head IC 34 is further provided for the disk enclosure 14. Combination heads 36-1 to 36-6 each having a recording head and a reproducing head are connected to the head IC 34. The combination heads 36-1 to 36-6 are provided for recording surfaces of magnetic disks 38-1 to 38-3, respectively, and moved to arbitrary track positions of the magnetic disks 38-1 to 38-3 by the driving of a rotary actuator by a VCM 40. The magnetic disks 38-1 to 38-3 are rotated at a predetermined speed by a spindle motor 42. A formatter and an ECC processing unit are provided for the hard disk controller 22 of the SCSI controller 10.

Figure 1:
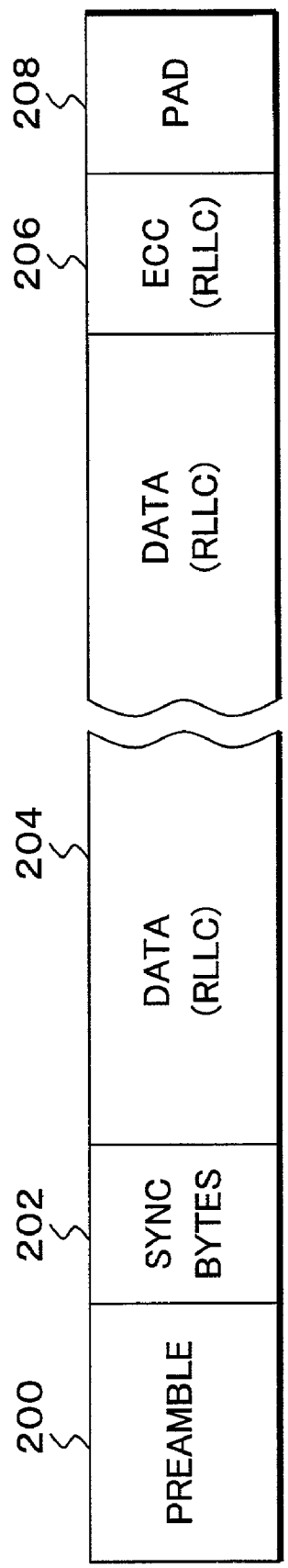
FIG. 1 is an explanatory diagram of a sector format which is used in a conventional magnetic disk apparatus.
Figure 2:
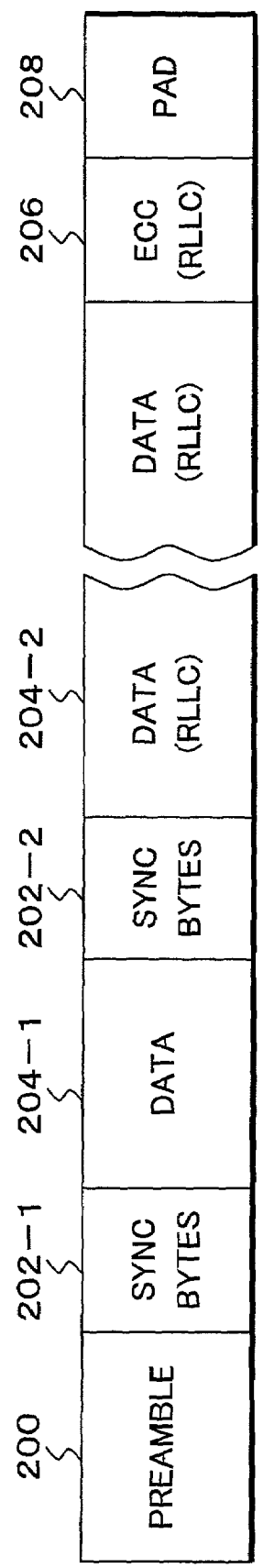
FIG. 2 is an explanatory diagram of another sector format which is used in the conventional magnetic disk apparatus.
Figure 3:
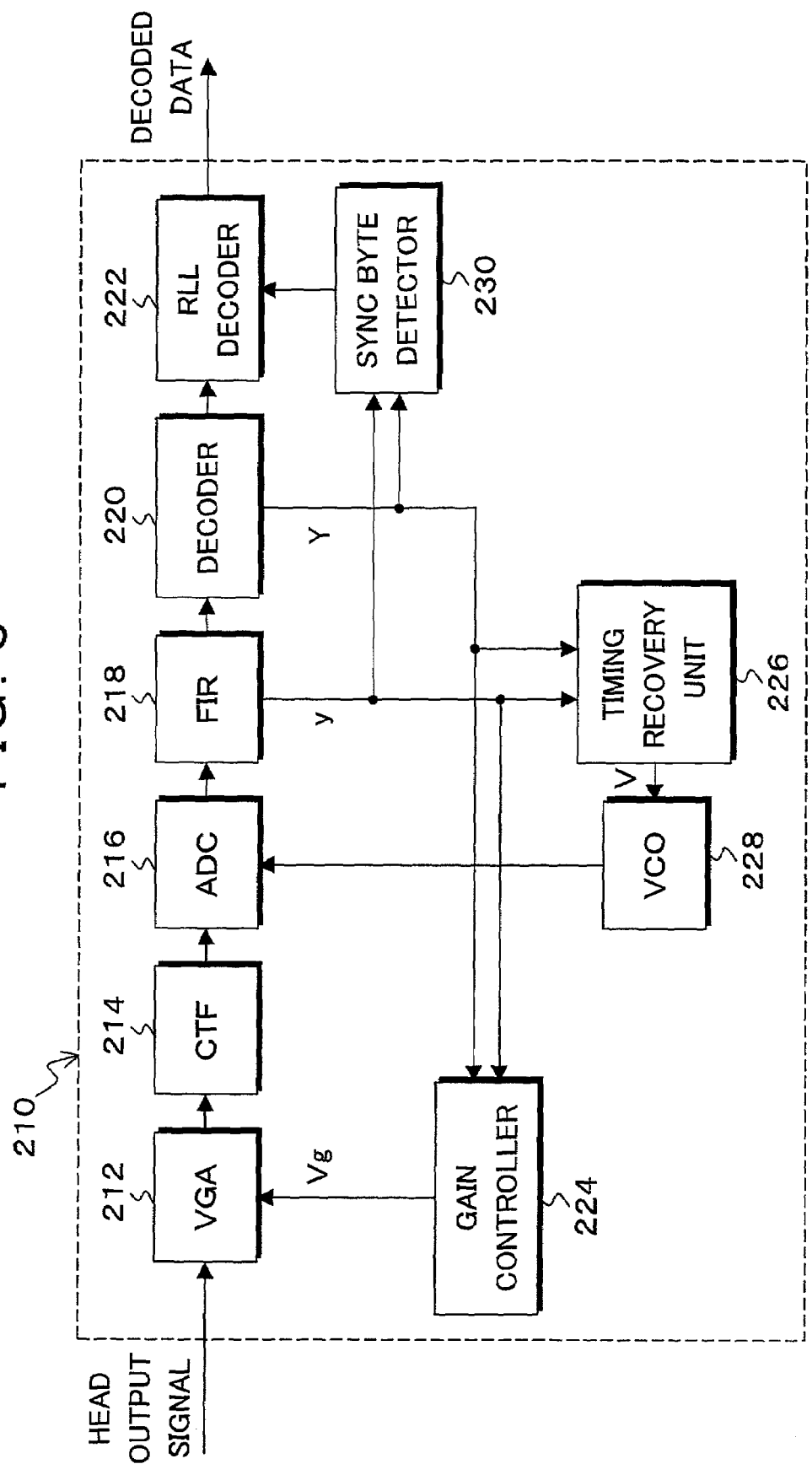
FIG. 3 is a block diagram of a conventional read channel for performing an amplitude correction and a timing recovery on the basis of sync clocks.
Figure 4:
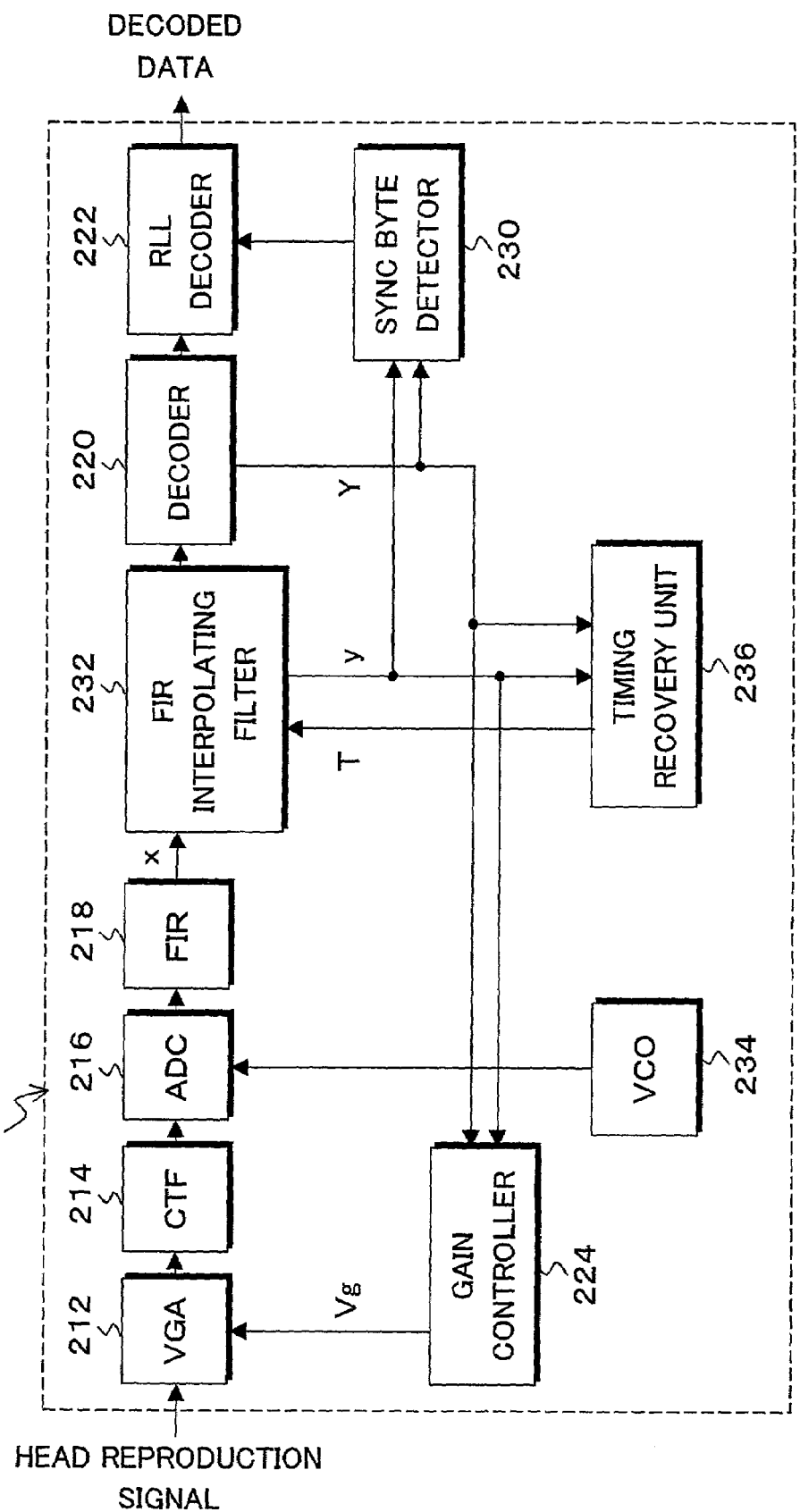
FIG. 4 is a block diagram of the conventional read channel for performing an amplitude correction and a timing recovery on the basis of asynchronous clocks.
Figure 6:
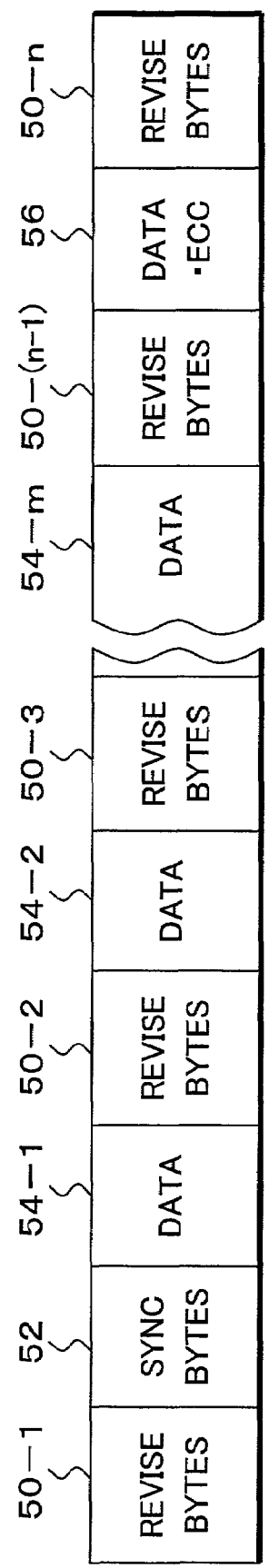
FIG. 6 is an explanatory diagram of an embodiment of a sector format which is used in magnetic recording and reproduction of the invention.

FIG. 6 shows an embodiment of a sector format which is used in information recording and reproduction of the invention. In this sector format, revise bytes 50-1, 50-2, ..., and 50-n using a predetermined specific code train, for example, a code train "1010 ... 10" are inserted into two or more portions including the head and last portions in the sector data, split data 54-1, 54-2, ..., and 54-n is arranged between the respective adjacent revise bytes, and further, data/ECC 56 is arranged between the revise bytes 50-(n−1) and the last revise bytes 50-n. Sync bytes 52 to presume the head bit of the data upon demodulation is arranged after the head revise bytes 50-1. Now, assuming that a data length of the sector format is equal to, for example, 512 bytes, in the conventional sector format shown in FIG. 1, since the data has been converted into the RLL code, about 256 bits in the 512 bytes exist as the number of bits which are caused by converting into the RLL code. On the other hand, in the sector format of the invention of FIG. 6, since the conversion by the RLL code is not performed with respect to the user data, with respect to 256 bits allocated to the conventional RLL code, they can be allocated to the revise bytes newly provided in the invention. Now, assuming that the number of revise bytes 50-1 to 50-n in FIG. 6 is equal to n=6, the user data is split into n (=5) data including the data/ECC 56. In the data of 512 bytes, 256 bits converted by the conventional RLL code can be allocated to the second to last revise bytes 50-2 to 50-6. For example, it is sufficient to allocate about 50 (256÷5) bits to each revise bytes. With respect to the head revise bytes 50-1, it is sufficient to allocate 100 to 200 bits in a manner similar to the conventional preamplifier. Therefore, even if the revise bytes 50-1 to 50-n are arranged to a plurality of portions including the head and last portions of the sector as shown in FIG. 6, a size that is almost the same as that of the sector format in which the conversion by the conventional RLL code has been performed can be obtained. Format efficiency of the medium does not deteriorate.

Figure 7:
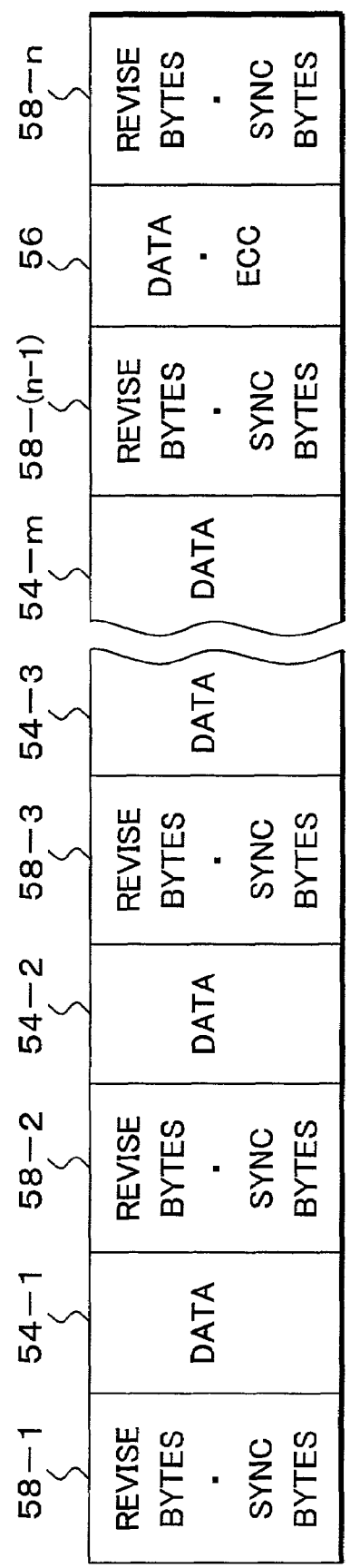
FIG. 7 is an explanatory diagram of another embodiment of a sector format which is used in the magnetic recording and reproduction of the invention.

FIG. 7 shows another embodiment of a sector format which is used in the information recording and reproduction of the invention. In this sector format, revise/sync bytes 58-1, 58-2, ..., and 58-n which are obtained by inserting sync bytes for presuming the data head position into the revise bytes which comprise a predetermined specific code ratio and are arranged to a plurality of portions including the head and last portions of the sector are provided. By embedding the sync bytes into the revise bytes as mentioned above, the head bit position of the data/ECC 56 of each of the split data 54-1 to 54-n and the data/ECC 56 can be more accurately presumed and an ECC process can be executed. Even if the data including the sync bytes is extinguished due to the thermal asperity (TA) or the like, the accurate ECC process can be executed by the sync bytes embedded in the normal revise byte portions. Naturally, it will be understood that a data length of each of the data 54-1 to 54-n and the data/ECC 56 in the sector format in which the revise bytes and the sync bytes 58-1 to 58-n in FIG. 7 have been inserted is set to a recovery possible length at which the data can be recovered by the ECC.

Figure 8:
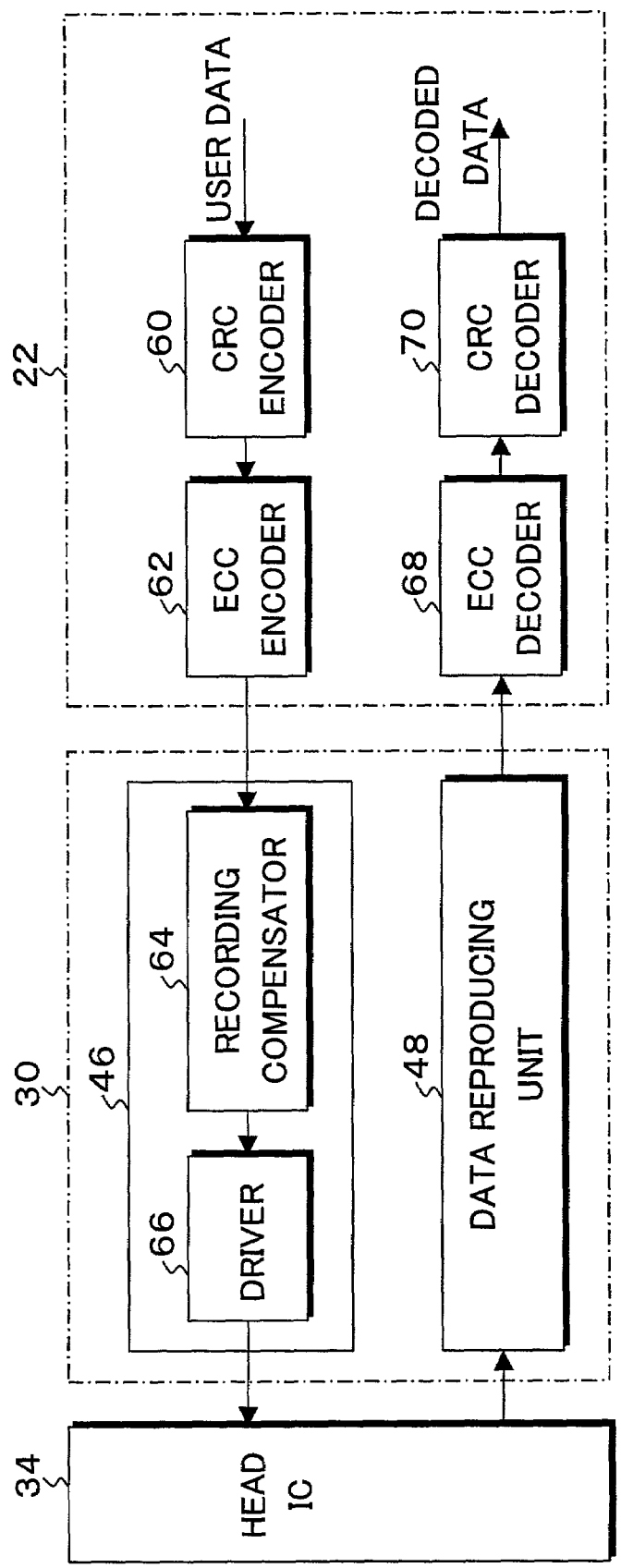
FIG. 8 is a block diagram of a schematic construction showing portions of a hard disk controller and a read channel in FIG. 5 in case of performing a Viterbi decoding.

In FIG. 8, an outline of the hard disk controller 22 and the read channel in the hard disk drive in FIG. 5 using the sector format in which a plurality of revise bytes in FIG. 6 or 7 have been inserted is shown together with the head IC 34. In the embodiment, a case of performing the Viterbi decoding is shown as an example. First, a recording system will be explained. A parity is added to the user data comprising a binary code of (1,0) by a CRC encoder 60 and an ECC encoder 62 of the hard disk controller 22. The CRC code is used for inhibiting an erroneous correction of the ECC. Subsequently, the user data is inputted to a recording compensator 64 provided in a data recording unit 46 of the read channel 30. A write compensation to slightly widen an inverting interval at a position where a magnetic transition is neighboring is executed. The head IC 34 is driven by a driver 66 and a guide current to a recording head is generated, thereby recording the data onto the medium. In the conventional data recording unit 46 of the read channel 30, the RLL encoder to stabilize the clock reproduction by the PLL is provided before the recording compensator 64. According to the invention, however, as shown in the sector format of FIG. 6 or 7, since a plurality of revise bytes are inserted and the clock reproduction is performed on the basis of the revise bytes, the RLL encoder is not provided. On the other hand, upon reproduction, an analog voltage from a reproducing head is first recorded by a preamplifier (not shown) built in the head IC 34 and, thereafter, it is sent to a data reproducing unit 48 of the read channel 30. Details of the data reproducing unit 48 will be clarified in a block diagram of FIG. 9. The data demodulated by the data reproducing unit 48 is subjected to an error correction by an ECC decoder 68 of the HDC 22 and a checking process by a CRC decoder 70 and outputted as decoded data.

Figure 9:
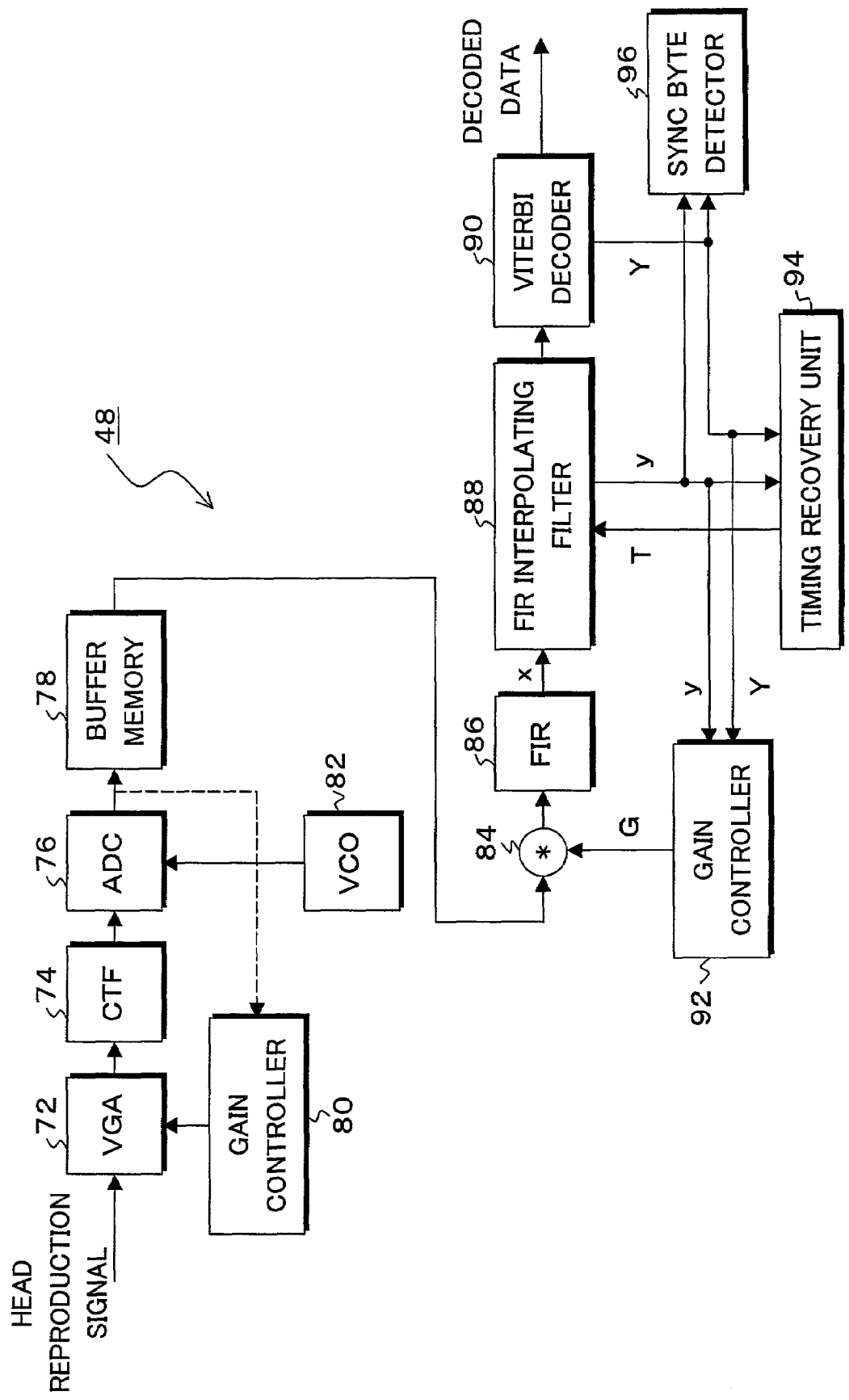
FIG. 9 is a block diagram of a data reproducing unit in the read channel in FIG. 8.
Figure 10:
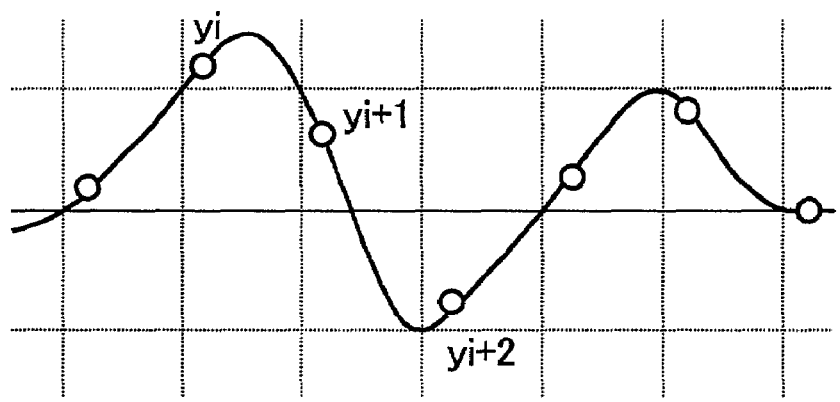
FIG. 10 is an explanatory diagram of an output signal waveform from an FIR filter in FIG. 9.

FIG. 9 is a block diagram showing an embodiment of the data reproducing unit 48 provided in the read channel 30 in FIG. 8. The head reproduced signal outputted from the head IC is transmitted through a variable gain amplifier (VGA) 72, a CT filter (CTF) 74 which functions as a low pass filter, and an A/D converter (ADC) 76 and converted into a digital signal. After that, it is stored into a buffer memory 78 on a sector unit basis. A gain controller 80 controls a gain of the VGA 72, thereby correcting the head reproduced signal to a predetermined amplitude. The ADC 76 samples the head reproduced signal by a clock from a voltage controlled oscillator (VCO) 82 and converts it into a digital signal. As a clock for sampling which is generated from the VCO 82, a fixed clock which is asynchronized with the head reproduced signal is used. After that, the sector data stored in the buffer memory 78 is read out and multiplied with a gain G from a gain controller 92 for a multiplier 84, so that it is digitally subjected to an amplitude correction. After that, the data is waveform equalized by an FIR filter 86 and inputted as an equalized signal x as shown in FIG. 10 to an FIR interpolating filter 88. The FIR interpolating filter 88 calculates a signal y having an amplitude at an inherent sampling time which is synchronized with the head reproduced signal on the basis of inherent timing T in the head reproduced signal calculated by a timing recovery unit 94. The filter 88 sends the interpolated equalized waveform signal y to a Viterbi decoder 90. In the Viterbi decoder 90, a correct signal Y is discriminated by a Viterbi algorithm with respect to the equalized signal y and the decoding signal Y is outputted to the hard disk controller side at the next stage. A sync byte detector 96 is also provided and the sync bytes are detected on the basis of the output signal y from the FIR interpolating filter 88 and the decision signal Y from the Viterbi decoder 90, thereby presuming the head bit of the data subsequent to the detecting position of the sync bytes. A detection output of the sync byte detector 96 is sent to an RLL decoder provided subsequently to the viterbi decoder 90 in the conventional apparatus and used for decoding. In the invention, however, since the RLL decoder is not provided, the detection output of the sync byte detector 96 is sent to the ECC decoder 68 or the like provided in the hard disk controller at the next stage and used for presuming the head bit of the data. The gain controller 92 obtains the gain error Δγ by using the output signal y outputted from the FIR interpolating filter 88 and the decision value Y=(0, −1, +1) from the Viterbi decoder 90, thereby making the amplitude correction.

Figure 11:
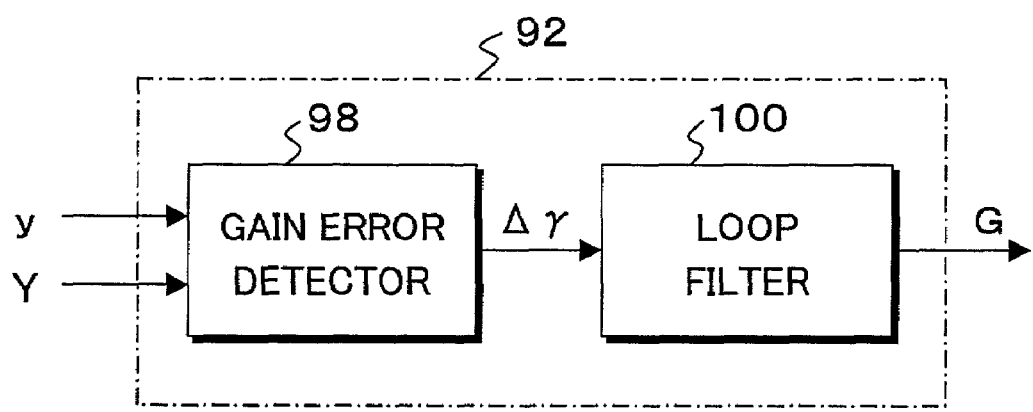
FIG. 11 is a block diagram of a gain controller in FIG. 9.

FIG. 11 is a block diagram of the gain controller 92 in FIG. 9. The gain controller 92 comprises a gain error detector 98 and a loop filter 100. The gain error detector 98 calculates the gain error Δγ by the 15 output signal y of the FIR interpolating filter 88 and the decision signal Y by the following equation (1).

$$\Delta\gamma = sgn(yi) \cdot (yi - Yi) \quad (1)$$

It is converted into the gain G by the loop filter 100. By multiplying the input signal with the gain G, the amplitude correction is made.

Figure 12:
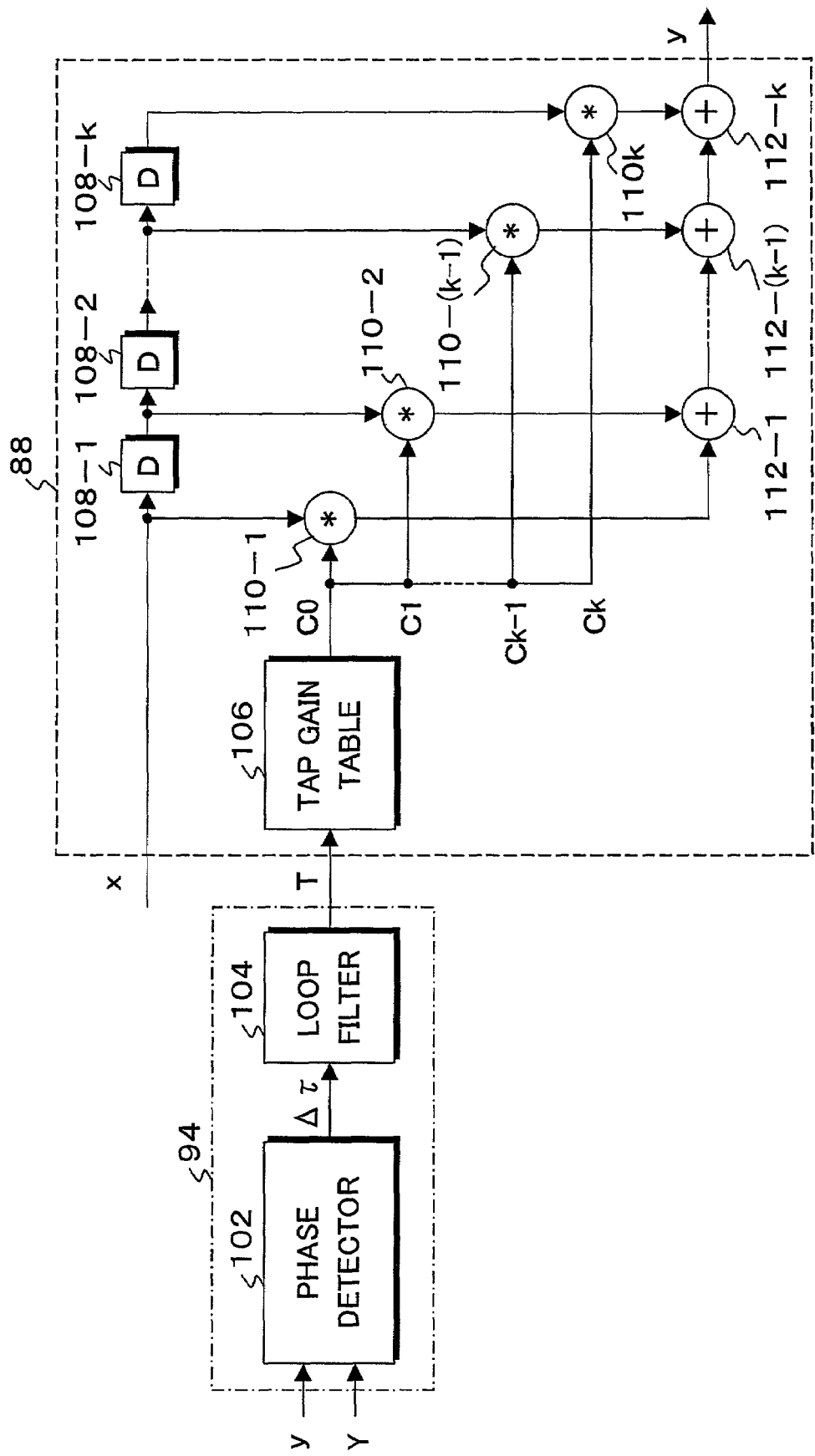
FIG. 12 is a block diagram of an interpolating filter in FIG. 9.

FIG. 12 is a block diagram of the FIR interpolating filter 88 and timing recovery unit 94 in FIG. 9. A phase discriminator 102 and a loop filter 104 are provided for the timing recovery unit 94. The phase discriminator 102 obtains phase information extracted from the signal corresponding to the revise bytes in the output signal y of the FIR interpolating filter 88 and sends the phase information to the loop filter 104, thereby obtaining the inherent sampling time T. By the interpolating operation of the FIR interpolating filter 88 by the sampling time T, the clock extraction for substantially executing the sampling of the signal amplitude synchronized with the inherent clock of the head reproduced signal again is executed. The FIR interpolating filter 88 has delay circuits 108-1 to 108-$k$ of k stages. The sampled data is multiplied with tap gains C0 to Ck given from a tap gain table 106 by multipliers 110-1 to 110-$k$. After that, the sums of respective outputs of the multipliers are sequentially obtained by adders 112-1 to 112-$k$, and a final sum is outputted as an output signal y. A construction for executing the block extraction from the signals corresponding to the revise bytes by using the FIR interpolating filter 88 as mentioned above will be described in detail hereinbelow.

Figure 13:
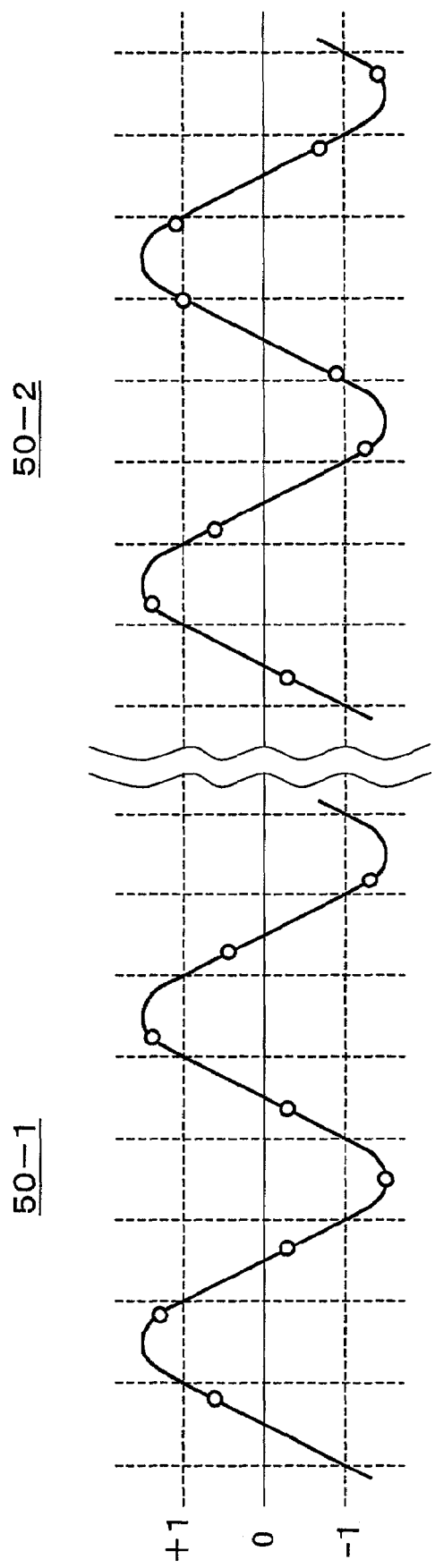
FIG. 13 is an explanatory diagram of a signal waveform of revise bytes outputted from the FIR filter in FIG. 9.

FIG. 13 shows sampling points of the output signal x obtained after the head reproduced signal in which the revise bytes have been inserted as shown in the sector format of FIG. 6 was equalized by the FIR filter 86 and an analog waveform of such an output signal x with respect to the revise bytes 50-$n$ and the next revise bytes 50-(n+1) through the data therebetween. Each white dot (blank circle) indicates a signal point sampled by the asynchronous clock generated from the VCO 82. A phase error is caused in the inherent timing shown by a broken line and a frequency shift is also caused. In the invention, the FIR interpolating filter 88 is allowed to execute a process for presuming a phase error of each signal point of the data existing between the revise bytes 50-$n$ and revise bytes 50-(n+1) which are located on both sides of the data on the basis of the phase information of the revise bytes 50-$n$ and revise bytes 50-(n+1) and correcting the amplitude to the amplitude value of the signal point of the inherent timing. That is, if the amplitude and phase of the sampled signal are found, the amplitude of the signal at the inherent timing can be predicted by the FIR interpolating filter 88. A method of deciding the phase under conditions such that the amplitude of the signal in the data area between the revise bytes 50-$n$ and revise bytes 50-(n+1) has already been known and the phase is unknown will be described here. The phase error of the ith sample in the revise bytes 50-$n$ is now assumed to be τ(n, i). Assuming that the recording code train of the revise bytes 50-$n$ is set to "1010 . . . 10", the head reproduced signal can be regarded as a sine curve. Therefore, assuming that an amplitude value of the ith sample is set to a(n, i), the phase error τ(n, i) is obtained by the following equation (2).

$$\tau(n, i) = \tan^{-1}\left(\frac{a(n, i+1)}{a(n, i)}\right) \quad (2)$$

A detecting method of the phase error is not limited to the equation (2) but it can be also detected by another method. Subsequently, it is assumed that a phase at the center of the revise bytes 50-$n$ is set to τc, a phase error due to a frequency deviation is set to τf (where, it is assumed that a frequency is constant in a range of the revise bytes 50-$n$), and further, an error due to noises included in the sampled amplitude is set to τe. The phase error of each of (i)=0 to 2 m in the revise bytes 50-$n$ is obtained from those parameters by the following equations (3).

$$\left.\begin{array}{l} \tau(n,0) = \tau c(n) - m \cdot \tau f(n) + \tau e(n,0) \\ \tau(n,1) = \tau c(n) - (m-1) \cdot \tau f(n) + \tau e(n,1) \\ \vdots \\ \tau(n,m-1) = \tau c(n) - \tau f(n) + \tau e(n,m-1) \\ \tau(n,m) = \tau c(n) + \tau e(n,m) \\ \tau(n,m+1) = \tau c(n) + \tau f(n) + \tau e(n,m+1) \\ \vdots \\ \tau(n,2m-1) = \tau c(n) + (m-1) \cdot \tau f(n) + \tau e(n,2m-1) \\ \tau(n,2m) = \tau c(n) + m \cdot \tau f(n) + \tau e(n,2m) \end{array}\right\} \quad (3)$$

Since an average of the phase errors due to the noises is regarded to be 0 here, the following equations can be obtained.

$$\tau c(n) = \frac{\sum_{i=0, i \neq m}^{i=2m} \tau(n,i)}{2m} + \overline{\tau e(n)} \approx \frac{\sum_{i=0, i \neq m}^{i=2m} \tau(n,i)}{2m} \quad (4)$$

$$\tau f(n) \approx \frac{\sum_{i=0}^{i=m/2-1} \tau(n,2i+1) - \tau(n,2i) + \sum_{i=m/2-1}^{i=m} \tau(n,2i) - \tau(n,2i-1)}{m} \quad (5)$$

Therefore, the phase τ(n, j) in the data sandwiched between the revise bytes 50-$n$ and revise bytes 50-(n+1) can be approximated by the following equation (6).

$$\tau(n,j) = F(\tau c(n), \tau c(n+1), j) + F(\tau f(n), \tau f(n+1), j) \cdot j \quad (6)$$

In the equation (6), a function F(a, b, j) denotes an internal division at j sandwiched by a and b. According to this phase deciding method, although only the phase information from the revise bytes 50-$n$ and revise bytes 50-(n+1) locating on both sides of the data has been used, it is also possible to raise the degree of an approximation equation of the equation (6) and improve its precision by taking into consideration to the phase information of one or a plurality of revise bytes which are adjacent to both sides other than those revise bytes 50-$n$ and 50-(n+1). According to the invention as mentioned above, the revise bytes are inserted into the data and recorded, upon reproduction, the phase of the data locating between the adjacent revise bytes is presumed from the phase information of the known revise bytes, and the amplitude is corrected to the amplitude value of the inherent tiling. Thus, even in the demodulation by the asynchronous clock, the amplitude is interpolated to the correct signal amplitude sampled at the inherent timing, and an error rate as decoding performance in the Viterbi decoding can be raised. Since the RLL code is not used, a situation such that the bit error in the RLL code word upon data demodulation is propagated upon decoding and becomes an error of a plurality of bits does not occur. By eliminating the error propagation due to the RLL code, the inherent ECC correcting ability can be made the most of.

Figure 14:
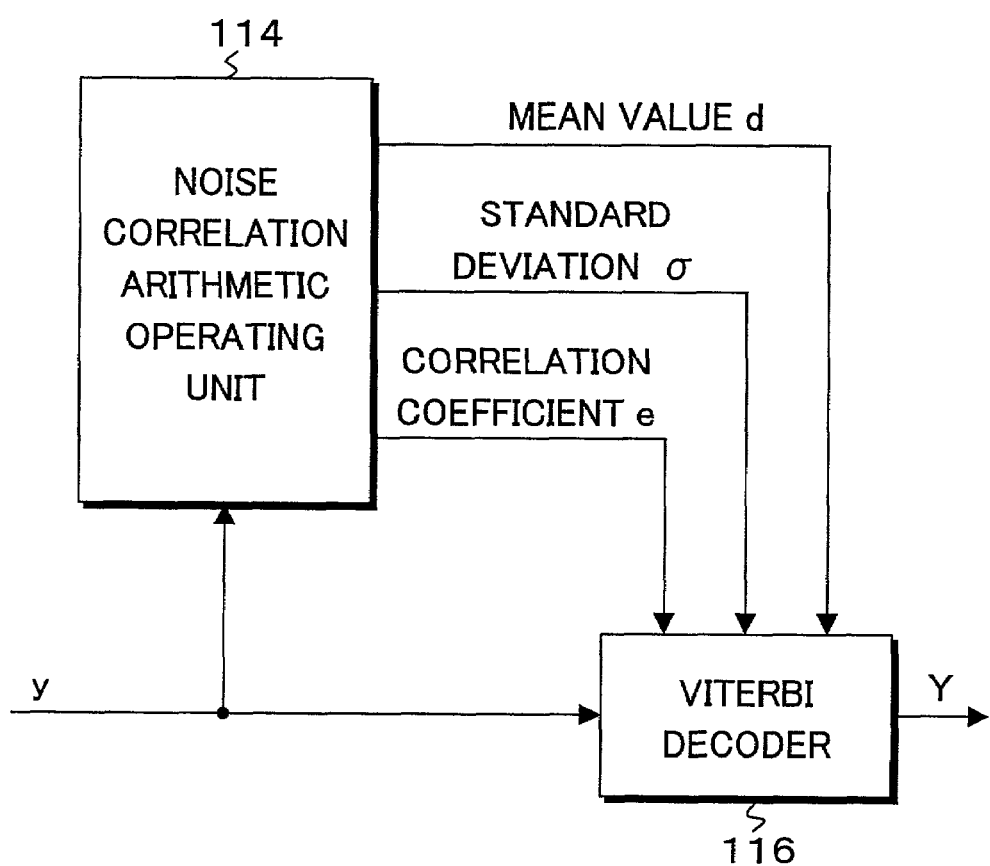
FIG. 14 is a block diagram of an embodiment in which a signal mean value and a standard deviation and a correlation of noises are obtained from the revise bytes and used in a likelihood calculation of the Viterbi decoding.

FIG. 14 is an explanatory diagram of an embodiment of the invention in which parameters in a likelihood calculation in the decoder are arithmetically operated from correspondence signals of the revise bytes and provided. In the embodiment, a noise correlation arithmetic operating unit 114 is newly provided for a Viterbi decoder 116. The noise correlation arithmetic operating unit 114 fetches the signals corresponding to the revise bytes in the phase-corrected output signal y which is outputted from the FIR interpolating filter 88 in FIG. 9 as a training signal series. On the basis of the signal series corresponding to the revise bytes, the unit 114 calculates a signal mean value d, a standard deviation σ of noises, and a correlation coefficient e of an autocorrelation, supplies them as noise correlation parameters to the Viterbi decoder 116, and uses them in a likelihood calculation for decoding the data from the signal corresponding to the data portion sandwiched by the revise bytes. Specifically speaking, in a calculation of a branch metric (channel information) in the Viterbi decoder 116, a Viterbi decoding of a noise predicting type can be realized by using the mean value d, standard deviation σ, and correlation coefficient e which were arithmetically operated from the signal corresponding to the revise bytes by the noise correlation arithmetic operating unit 114.

Explanation will be further made in detail. In the Viterbi decoder 116 in FIG. 14, in order to cope with deterioration in performance due to non-linear factors such as PE, NLTS, and the like which depend on the recording signal pattern on the medium, it is assumed that $2^{N+Q+1}$ states $S^m_0$ to $S^m_{2^{(N+Q+1)}-1}$ for binary recording signals $x_{k-N}, \ldots, x_k, \ldots, x_{k-Q}$ of past N bits and future Q bits are predetermined and the signal and noise parameters are allowed to have a recording signal state dependency. Mean values $d(S^m_0)$ to $d(S^m_{2^{(N+Q+1)}-1})$ of an equalized waveform $y_k$ for the states $S^m_0$ to $S^m_{2^{(N+Q+1)}-1}$ are obtained by the unit 114 by using the revises byte series. In the embodiment, it is assumed that equalizer output noises $n_k$ at time point k are obtained by the following equation (7).

$$n_k = w_k + \sum_{i=-L}^{-1} e_i(s^m_k) n_{k-i} + \sum_{i=1}^{M} e_i(s^m_k) n_{k-i} \quad (7)$$

where, $S^m_k$: state at time point k

For simplicity of the apparatus, an ideal equalized waveform for the state $S^m_k$ can be also used in place of $d(S^m_k)$. As a noise model of a PR channel, it is assumed that the equalizer output noises $n_k$ are colored noises having a frequency dependency and, on a time base, they have an autocorrelation of a Gauss-Markov chain having a correlation with the noises of past L bits and future M bits. At this time, the output noises $n_k$ are as shown by the following equation (8).

$$\sigma^2(s^m_k) = \left\langle \left( n_k - \sum_{i=-L}^{-1} e_i(s^m_k) n_{k-i} - \sum_{i=1}^{M} e_i(s^m_k) n_{k-i} \right)^2 \right\rangle \quad (8)$$

where, $e_{-L}(S^m_k)$ to $e_{-1}(S^m_k)$: weights for the present time point of the noises of the past L bits which depend on the recording state $S^m_k$ $e_1(S^m_k)$ to $e_M(S^m_k)$: weights for the present time point of the noises of the future M bits which depend on the recording state $S^m_k$ $w_k$: white Gaussian noises which are added at the present time point Since $w_k$ is not concerned with $n_{k-L}, \ldots, n_{k-1}, n_{k+1}, \ldots,$ and $n_{k+L}$, as $e_{-L}(S^m{}_k), \ldots, e_{-1}(S^m{}_k), e_1(S^m{}_k), \ldots,$ and $e_M(S^m{}_k)$, it is sufficient to obtain the value in which the following variance of $w_k$ becomes minimum.

$$\left\langle n_{k-j}\left(n_k - \sum_{i=-L}^{M} e_i(s_k^m)n_{k-i}\right)\right\rangle = \qquad (9)$$

$$R_{nn}(j \mid s_k^m) - \sum_{i=-L}^{M} e_i(s_k^m)R_{nn}(j-i \mid s_k^m) = 0$$

$$(-M \leq i, j \leq L, i \neq 0, j \neq 0)$$

where, $\langle \ \rangle$: expected value

Therefore, assuming that an expected value of an auto-correlation function of $n_k$ for state $S^m{}_k$ is set to $R_{\_}(j|S^m{}_k) = \langle n_k n_{k+j}|S^m{}_k\rangle$, $(-L \leq j \leq M)$, it is sufficient that the following equation (10) is satisfied due to the method of Minimum Mean Square Error.

$$R_{\setminus L+1}(s_k^m) = \begin{bmatrix} R_{i,j(1\leq i\leq L, 1\leq j\leq L)}(s_k^m) & R_{i,j(1\leq i\leq L, L+2\leq j\leq L+M+1)}(s_k^m) \\ R_{i,j(L+2\leq i\leq L+M+1, 1\leq j\leq L)}(s_k^m) & R_{i,j(L+2\leq i\leq L+M+1, L+2\leq j\leq L+M+1)}(s_k^m) \end{bmatrix} \qquad (10)$$

Therefore, assuming that an $(L+M+1)\times(L+M+1)$ covariance matrix of $n_k$ is set to $R_{i,j}(S^m{}_k)=[R_{nn}(j-i|S^m{}_k)]$ $(1 \leq i, j \leq L+M+1)$, a matrix $R_{\setminus L+1}(S^m{}_k)$ from which the $(L+1)$ row and $(L+1)$ column components have been excluded is expressed by the following equation (11).

$$e(s_k^m) = R_{\setminus L+1}^{-1}(s_k^m) r(s_k^m) \qquad (11)$$

Now, assuming that $e(s^m{}_k) = \{e_{-L}(s^m{}_k), \ldots, e_{-1}(s^m{}_k), e_1(s^m{}_k), \ldots, e_M(s^m{}_k)\}$, $r(s^m{}_k) = \{R_{nn}(-L|s^m{}_k), \ldots, R_{nn}(-1|s^m{}_k), R_{nn}(1|s^m{}_k), \ldots, R_{nn}(M|s^m{}_k)\}^T$ $e(s^m{}_k)$ is obtained by the following equation (12).

$$\sigma^2(s_k^m) = R_{nn}(0|s_k^m) - r^T(s_k^m) R_{\setminus L+1}^{-1}(s_k^m) r(s_k^m) \qquad (12)$$

A variance $\sigma^2(s^m{}_k)$ of the white Gaussian noises $w_k$ at this time is obtained by the following equation (13).

$$p(n_k \mid n_{k-L}, \ldots, n_{k-1}, n_{k+1}, \ldots, n_{k+M}) = \qquad (13)$$

$$\frac{1}{\sqrt{2\pi}\,\sigma(s_k^m)} \exp\left(-\frac{\left(n_k - \sum_{i=-L}^{-1} e_i(s_k^m)n_{k-i} - \sum_{i=1}^{M} e_i(s_k^m)n_{k-i}\right)^2}{2\sigma^2(s_k^m)}\right)$$

To raise a decoding precision, in the calculation of the branch metric, a noise predictive Viterbi decoding in which a correlation for the past and future noises which depend on the recording pattern has been introduced is performed. Now, assuming that $e(S^m{}_k)$ and $\sigma(S^m{}_k)$ obtained by the equations (12) and (13) depend on the state $S^m{}_k$ of the signal like a correlation and a standard deviation of the noises for the state of the signal on the medium, the noise predictive Viterbi decoding of the recording signal depending type can be realized in a calculation of channel information $\Lambda_c(y_k)$. Now, assuming that the input noises of the Verb decoder 116 are a Markov chain having a correlation with the noises of the past L bits and future M bits, its probability density function is expressed by the following equation (14).

$$\Lambda_c(y_k \mid s_k^m) = -\ln\sigma(s_k^m) - \frac{\left(n_k - \sum_{i=-L}^{-1} e_i(s_k^m)n_{k-i} - \sum_{i=1}^{M} e_i(s_k^m)n_{k-i}\right)^2}{2\sigma^2(s_k^m)} \qquad (14)$$

By multiplying the right side of the equation (14) with $(2\pi)^{1/2}$ and obtaining a natural logarithm, the branch metric (channel information) $\Lambda_c(y_k\, S_k^m)$ depending on the recording signal in the Viterbi decoding is obtained.

$$\Lambda_c(y_k \mid s_k^m) = \qquad (15)$$

$$-\ln\sigma(s_k^m) - \frac{\left(y_k - d(s_k^m) - \sum_{i=-L}^{-1} e_i(s_k^m)(y_{k+i} - d(s_{k+i}^m)) - \sum_{i=1}^{M} e_i(s_k^m)(y_{k+i} - d(s_{k+i}^m))\right)^2}{2\sigma^2(s_k^m)}$$

To calculate the equation (15), it is necessary to presume the noises of the past L bits and future M bits. For this purpose, all path metrics of an interval from $k-L-1$ to $k+M$ which pass through a path that is shifted from the state $S_{k-1}$ to the state $S_k$ of the PR channel are calculated and the path whose value becomes minimum is obtained. It is assumed that mean values $d(S^m{}_{k-L-1})$ to $d(S^m{}_{k+M})$ of the equalized waveforms corresponding to the shortest path are obtained and the equalized noises $n_k$ are presumed from the equation (7). Therefore, the equation (15) becomes as follows.

$$\Lambda_c(y_k \mid s_k^m) = -\ln\sigma(s_k^m) - \frac{(y_k - d(s_k^m))^2}{2\sigma^2(s_k^m)} \qquad (16)$$

The branch metric $\Lambda_c(y_k|S^m{}_k)$ of the equation (16) is calculated from the white noise value and its deviation $\sigma(S^m{}_k)$ for the past and future states as mentioned above and, thereafter, a likelihood in the Viterbi decoding is obtained from this branch metric.

Figure 15:
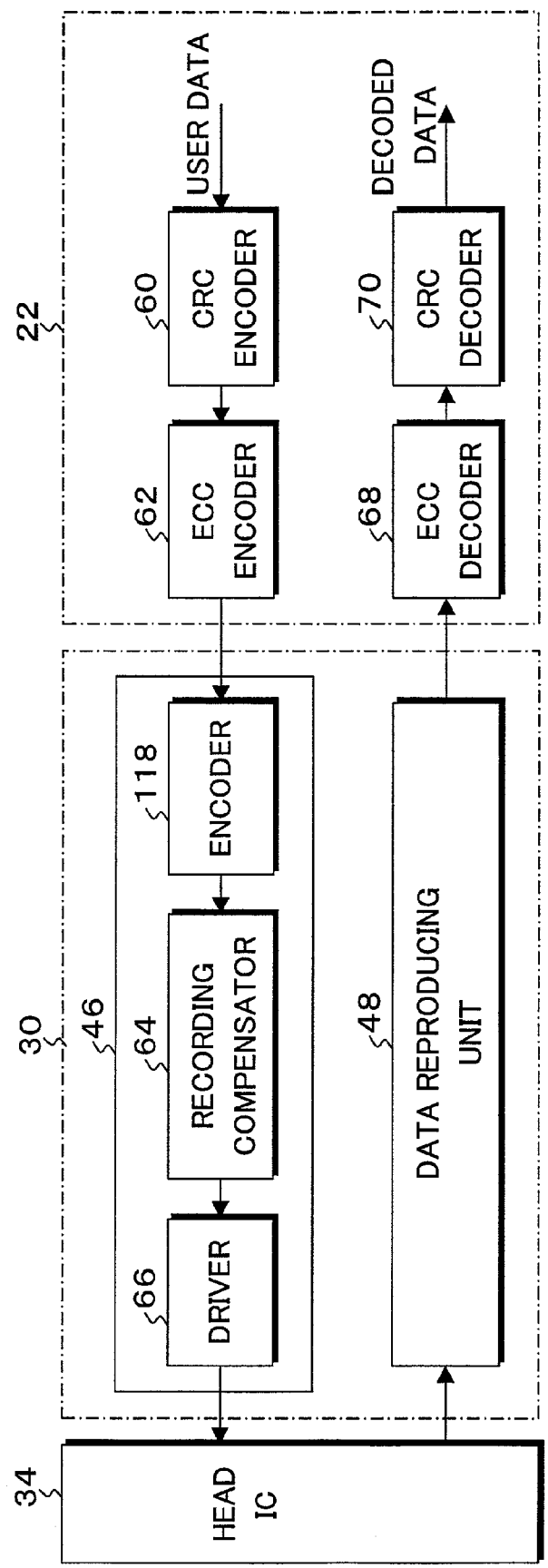
FIG. 15 is a block diagram of a schematic construction showing the portions of the hard disk controller and the read channel in FIG. 5 in case of performing an iterative decoding.

FIG. 15 shows a construction of a main portion of the recording and reproducing system in the hard disk drive in FIG. 5 in the case where the invention was applied to an iterative decoding method which has been proposed in recent years as a new encoding and decoding method in place of the viterbi decoding. As such an iterative decoding method, a low density parity check encoding method (LDPC) or a turbo encoding decoding method has been known. In the hard disk controller 22, the parity by the CRC encoder 60 and ECC encoder 62 is first added to the user data. Subsequently, in the read channel 30, the recording data is sent to the head IC 34 via an encoder 118, the recording compensator 64, and the driver 66 of the iterative decoding method, and a write current to the recording head is generated, thereby recording the data onto the magnetic disk. Upon reproduction, the analog voltage from the reproducing head is first amplified by the preamplifier of the head IC 34 and, thereafter, it is sent to the data reproducing unit 48 of the read channel 30 and decoded. A decoding result is returned to the HDC 22 and becomes the reproduced data via the ECC decoder 68 and CRC decoder 70.

Figure 16A:
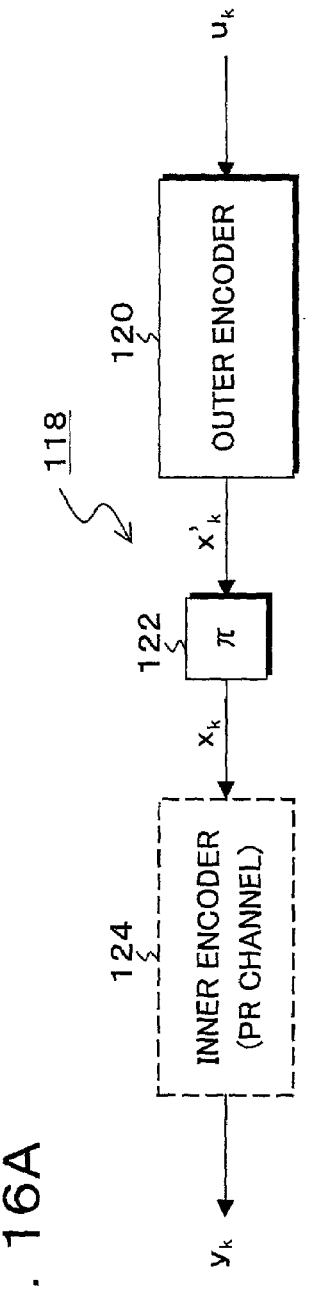
FIGS. 16A and 16B are block diagrams of other fundamental constructions of an encoder which is applied to the iterative decoding in FIG. 15 and a decoder for obtaining the signal mean value and a standard deviation and a correlation of noises are obtained from the revise bytes and calculating a likelihood of the iterative decoding.
Figure 16B:
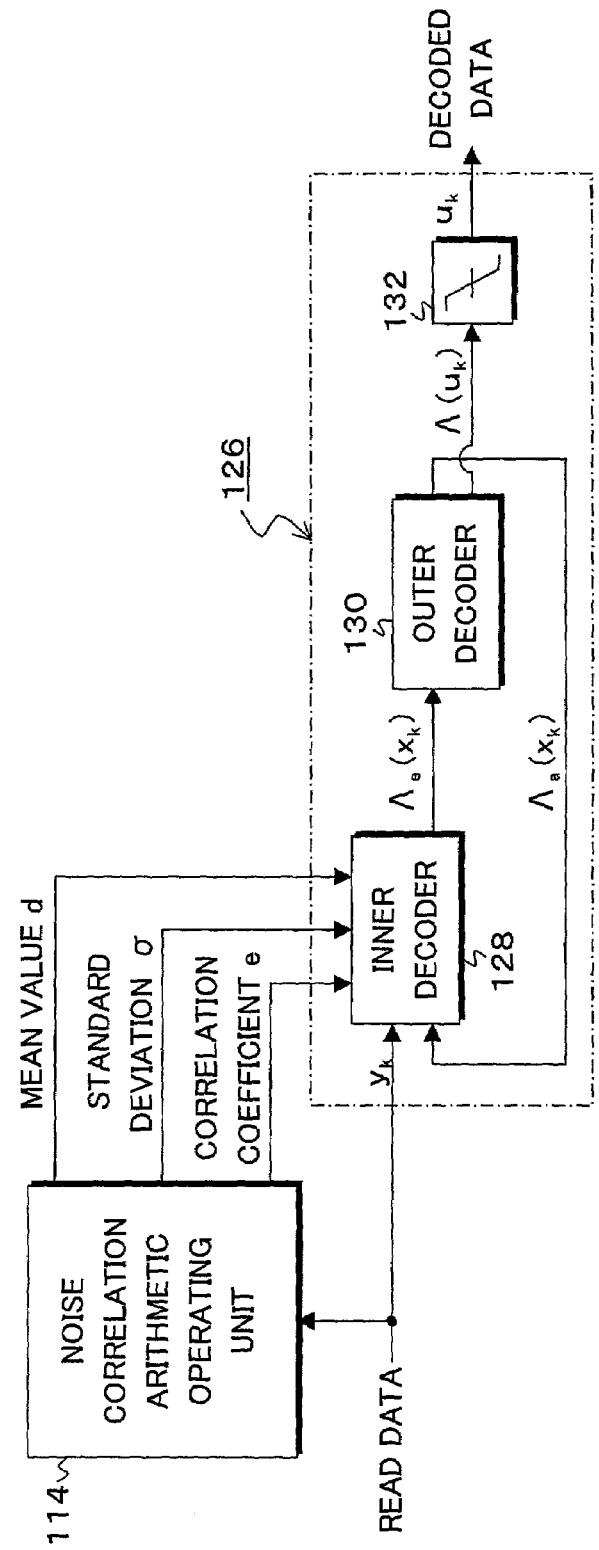

FIG. 16A shows a fundamental construction of the encoder 118 in FIG. 15. FIG. 16B shows a fundamental construction of the decoder. In FIG. 16A, the encoder 118 is constructed by serially concatenating an outer encoder 120 and an inner encoder 124. In the PR channel, since the channel itself can be regarded as a convolutional encoder, there is no need to provide the inner encoder 124. An iterative decoder 126 in FIG. 16B comprises two SISO (Soft-in Soft-out) decoders: that is, an inner decoder (channel maximum a posteriori probability decoder) 128 and an outer decoder (outer code maximum a posteriori probability decoder) 130. After the iterative decoding is executed a predetermined number of times between the inner decoder 128 and outer decoder 130, decoded data is formed by a threshold value process of a hard discriminating block 132 and outputted. That is, it is a characteristic point of the iterative decoding method that an MAP (Maximum A posteriori Probability) decoding is performed. For this purpose, the two element decoders do not output a hard decision result such as mere 0 or 1 but output reliability information such as 0.4 or 0.9. In the construction of the iterative decoder 126 in FIG. 16B, only the main portion is illustrated and, actually, modules other than the modules shown here are added between the component elements. For example, there is a case where a random interleaver is inserted between the inner decoder 128 and outer decoder 130.

First, a procedure by a BCJR (Bahl-Cocke-Jeinek-Raviv) decoding method which is executed in the inner decoder 128 will be described in detail. The inner decoder 128 calculates external information $\Lambda e(x_k)$ by using the read signal $y_k$ from the channel and prior information $\Lambda_a(x_k)$ from the outer decoder 130. A trellis which expresses a state transition of the code is now considered. The channel information $\Lambda_c(y_k)$ is obtained by the following equation (17) from the read signal $y_k$ and an ideal signal $m_k$ associated with its state transition every possible state transition.

$$\Lambda_c(y_k) = -\frac{1}{2\sigma^2}(y_k - m_k)^2 \qquad (17)$$

where, $\sigma^2$: variance value of the noises

Subsequently, a path metric $\gamma$ for the state transition $(S_{k-1} \rightarrow S_k)$ is obtained by the following equation (18).

$$\gamma_k(s_{k-1}, s_k) = \exp\{x_k \Lambda_a(x_k)\} \exp\{\Lambda_c(y_k)\} \qquad (18)$$

By a recursive calculation in the forward direction, $$\alpha_k(s_k) = \sum_{s_{k-1}} \alpha_{k-1}(s_{k-1}) \gamma_k(s_{k-1}, s_k) \qquad (19)$$

is obtained.
By a recursive calculation in the backward direction, $$\beta_{k-1}(s_{k-1}) = \sum_{s_k} \beta_k(s_k) \gamma_k(s_{k-1}, s_k) \qquad (20)$$

is obtained.
Assuming that the initial state and the end state are equal to the state 0, terminating conditions are as follows.

$$\alpha_0(s_0) = \begin{cases} 1, & \text{if } s_0 = 0 \\ 0, & \text{if } s_0 \neq 0 \end{cases} \qquad (21)$$

$$\beta_N(s_N) = \begin{cases} 1, & \text{if } s_N = 0 \\ 0, & \text{if } s_N \neq 0 \end{cases}$$

Therefore, an a posteriori probability $\Lambda(x_k)$ is calculated from $\alpha$, $\beta$, and $\gamma$ by the following equation (22).

$$\Lambda(x_k) = \ln \frac{\sum_{S1} \alpha_{k-1}(s_{k-1}) \gamma_k(s_{k-1}, s_k) \beta_k(s_k)}{\sum_{S0} \alpha_{k-1}(s_{k-1}) \gamma_k(s_{k-1}, s_k) \beta_k(s_k)} \qquad (22)$$

Finally, the external information $\Lambda e(x_k)$ is obtained by subtracting the prior information $\Lambda a(x_k)$ as follows.

$$\Lambda e(x_k) = \Lambda(x_k) - \Lambda a(x_k) \qquad (23)$$

In a manner similar to the case of the viterbi decoder in FIG. 14, the noise correlation arithmetic operating unit 114 for calculating the mean value d of the signal and the standard deviation σ and correlation coefficient e of the noises from the signal series corresponding to the revise bytes is also provided for the iterative decoder 126. The inner decoder 128 repeats processes for obtaining the channel information $\Lambda c(y_k|S^m_k)$ in the data area from the equation (16) by using the mean value d of the signal and the standard deviation σ and correlation coefficient e of the noises which were calculated by the noise correlation arithmetic operating unit 114, obtaining the external information $\Lambda e(x_k)$ from the equations (18) to (23), and outputting them to the outer decoder 130.

According to the invention as mentioned above, the RLL code for the clock extraction and the gain tracking is eliminated, a plurality of revise bytes comprising the specific code train are inserted into the data in place of the RLL code, the resultant data is recorded, and thereafter, the data is reproduced. Therefore, since the revise bytes are the well-known data train, the decision value does not become an error upon demodulation. Even in the case where the S/N ratio of the reproduced signal is low, the stable clock extraction and amplitude correction can be performed and the decoding performance (error rate) can be improved.

Since the RLL decoding is not executed, the error propagation due to the RLL decoding can be eliminated. Thus, the inherent ECC correcting ability can be made the most of.

The invention incorporates many proper modifications without losing the objects and advantages of the invention and is not limited by the numerical values shown in the foregoing embodiment.

What is claimed is:

1. An information recording and reproducing apparatus for recording and reproducing information onto/from a magnetic recording medium, comprising:
    a data recording unit which inserts a predetermined specific code train into at least two or more portions including head and last portions of data and records the data onto the medium upon data recording; and
    a data reproducing unit which separates a head reproducing signal by using clocks and thereafter, executes a clock extraction and an amplitude correction by using a signal corresponding to said specific code train upon data reproduction,
    wherein said data reproducing unit obtains a signal mean value and a standard deviation and an autocorrelation of noises by using the signal corresponding to said specific code train and uses them in a likelihood calculation of a data decoding.

2. A signal decoding circuit for recording and reproducing information onto/from a magnetic recording medium, comprising:
    a data recording unit which inserts a predetermined specific code train into at least two or more portions including head and last portions of data and records the data onto the medium upon data recording; and
    a data reproducing unit which separates a head reproducing signal by using clocks and thereafter, executes a clock extraction and an amplitude correction by using a signal corresponding to said specific code train upon data reproduction,
    wherein said data reproducing unit obtains a signal mean value and a standard deviation and an autocorrelation of noises by using the signal corresponding to said specific code train and uses them in a likelihood calculation of a data decoding.

3. An information recording and reproducing method of recording and reproducing information onto/from a magnetic recording medium, comprising the steps of:
    inserting a predetermined specific code train into at least two or more portions including head and last portions of data and recording the data onto the medium upon data recording; and
    separating a head reproduced signal by using clocks and, thereafter, executing a clock extraction and an amplitude correction by using a signal corresponding to said specific code train upon data reproduction,
    wherein upon data reproduction, a signal mean value and a standard deviation and an autocorrelation of noises are obtained by using the signal corresponding to said specific code train and used in a likelihood calculation of a data decoding.

* * * * *